BINARY CODED DECIMAL TO BINARY TRANSLATOR

Filed Sept. 21, 1960 2 Sheets-Sheet 1

FIG. 1

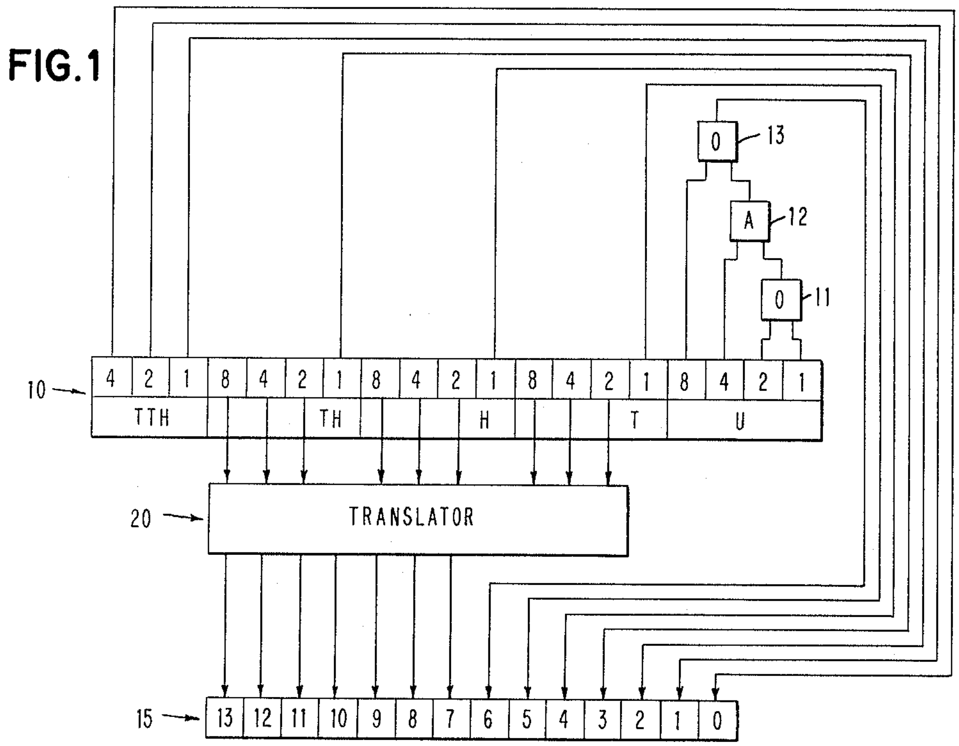

FIG. 3

| | | | | | | | | |
|---|---|---|---|---|---|---|---|---|
| 0 | TH4 | TH2 | H4 | H2 | T4 | T2 | $\overline{T8} \cdot \overline{H8} \cdot \overline{TH8}$ | CASE 1 |
| 1 | 0 | 0 | TH4 | TH2 | T4 | T2 | $\overline{T8} \cdot H8 \cdot \overline{TH8}$ | CASE 2 |
| 1 | 0 | 1 | H4 | H2 | T4 | T2 | $\overline{T8} \cdot \overline{H8} \cdot TH8$ | |
| 1 | 1 | 0 | H4 | H2 | TH4 | TH2 | $T8 \cdot \overline{H8} \cdot \overline{TH8}$ | |
| 1 | 1 | 1 | 0 | 0 | TH4 | TH2 | $T8 \cdot H8 \cdot \overline{TH8}$ | CASE 3 |
| 1 | 1 | 1 | 0 | 1 | T4 | T2 | $\overline{T8} \cdot H8 \cdot TH8$ | |
| 1 | 1 | 1 | 1 | 0 | H4 | H2 | $T8 \cdot \overline{H8} \cdot TH8$ | |
| 1 | 1 | 1 | 1 | 1 | 0 | 0 | $T8 \cdot H8 \cdot TH8$ | CASE 4 |
| B13 | B12 | B11 | B10 | B9 | B8 | B7 | | |

FIG. 2

| 8 | 4 | 2 |
|---|---|---|
| 0 | 0 | 0 |
| 0 | 0 | 1 |
| 0 | 1 | 0 |
| 0 | 1 | 1 |
| 1 | 0 | 0 |

INVENTORS
ROBERT A. ANDERSON
DAVID T. BROWN
BY Robert W. Berray
ATTORNEY

Dec. 8, 1964 R. A. ANDERSON ETAL 3,160,872

BINARY CODED DECIMAL TO BINARY TRANSLATOR

Filed Sept. 21, 1960 2 Sheets-Sheet 2

United States Patent Office 3,160,872

Patented Dec. 8, 1964

3,160,872

BINARY CODED DECIMAL TO BINARY TRANSLATOR

Robert A. Anderson, Springfield, Mass., and David T. Brown, Poughkeepsie, N.Y., assignors to International Business Machines Corporation, New York, N.Y., a corporation of New York Filed Sept. 21, 1960, Ser. No. 57,499
7 Claims. (Cl. 340—347)

This invention relates to a translator and more particularly to a binary coded decimal-to-binary translator utilized in three dimensional memory addressing.

Certain computer manufacturers, at the present time, are producing digital computer memories as a standard and complete unit. This unit would contain a three dimensional array of magnetic cores or other bistable devices, an address register, an address decoding switching matrix, sense amplifiers and a memory buffer register for receiving an addressed computer word. The standard memory units are produced primarily for addition to existing computer systems to enlarge those systems.

Some digital computers operate in a mode calling for entirely straight binary type of operation. These computers operate on multi-order computer words in straight binary notation. Other digital computers may operate in what is known as the binary coded decimal mode of operation. In this case a computer word may consist of several characters, each character of which is coded in the binary coded decimal system.

At the present time the practice has been to design a memory unit for the binary digital computer and a separate memory unit for a binary coded decimal digital computer. Great savings of manufacturing time and expense, and thus computer cost, would be realized if a single standard memory unit could be used with both straight binary and binary coded decimal computing systems. In order to make a memory unit designed for use with a straight binary digital computer useful in a binary coded decimal computing system, a translation must be made between a memory address in the binary coded decimal system to a straight binary address. Prior to this invention a translation would have been made from a binary coded decimal address to a binary address by utilizing one of several known translators. A method of translation is known in the prior art which requires a time-consuming serial translation which regenerates a binary number equal to a binary coded decimal number. Other systems are known which operate in a parallel fashion which requires the use of several logic levels including complicated full adders and half adders and other logic. The expense involved in the use of either of the two mentioned systems greatly reduces any savings which might be realized in using a single standard memory unit.

It is a primary object of this invention to provide a binary coded decimal address to binary address translator with a speed and simplicity never before realized in the prior art.

It is another object of this invention to provide such a translator which operates on a parallel basis requiring only two levels of simple logic.

It is also an object of this invention to provide a translator wherein certain binary digits of a binary coded decimal order are transferred directly to a binary register leaving only a minimum number of binary digits in the binary coded decimal orders to be translated.

These and other objects are achieved in one specific embodiment of the invention wherein a binary coded decimal address in a first register is translated to a straight binary address in a second register by directly transferring at least the lowest order binary digit of each binary coded decimal order directly to predetermined corresponding orders of a binary register. The remaining binary digits of the highest order binary coded decimal order are also directly transferred to corresponding predetermined orders of the binary register. The remaining binary digits of the other binary coded decimal orders are logically combined to produce a unique combination of binary digits in the remaining orders of the binary register in accordance with each permutation possible of those remaining binary digits.

While the invention has been particularly shown and described with references to a preferred embodiment thereof, it will be understood by those skilled in the art that various changes in form and details may be made therein without departing from the spirit and scope of the invention.

In the figures:

FIG. 1 is a block diagram showing a translator between a binary coded decimal memory address register and a binary address register and indicates those binary coded decimal digits inserted directly to the binary register and those digits which are translated.

FIG. 2 is a table showing the possible combinations the binary digits to be translated can assume.

FIG. 3 is a matrix table showing the relationship between those lines entering and leaving the translator shown in FIG. 1.

Figure 4:
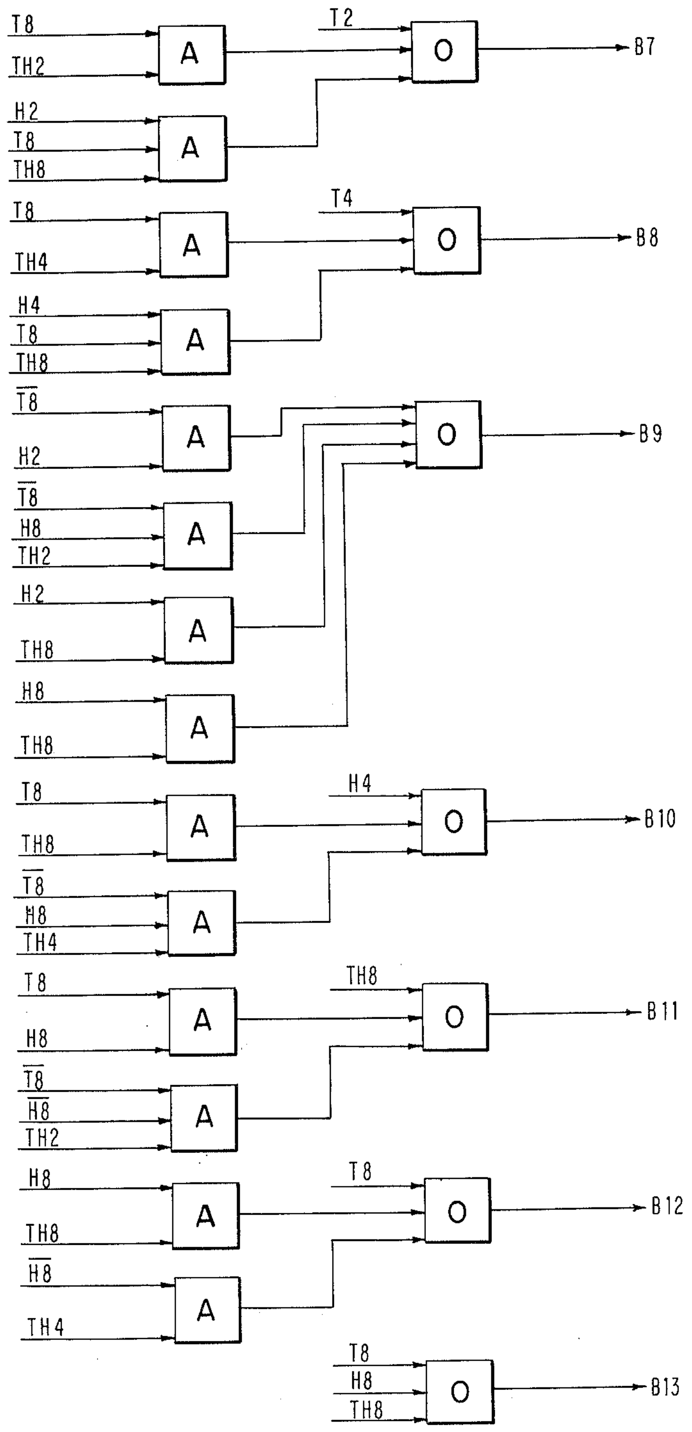
FIG. 4 shows the logic necessary for realizing the relationships shown in FIG. 3.

FIG. 1 shows an actual and preferred embodiment of the invention and includes a multi-order binary coded decimal memory address register 10. There are five binary coded decimal orders in the register 10, each of which is coded with binary digits 1–2–4–8. The binary coded decimal orders are identified as units (U), 10's (T), 100's (H), 1000's (TH), and 10,000 (TTH). In the preferred embodiment of the invention the units order of register 10 energizes a group of logic circuits including an OR circuit 11, an AND circuit 12 and an OR circuit 13 which is operative to indicate the magnitude of the decimal number in the units position. OR circuit 13 produces a logical binary "1" when the decimal number is greater than 4. The reason for this will be more clearly explained later.

The output of OR circuit 13, and the lowest order binary digit of the decimal orders T, H, and TH, and all the binary digits of the TTH decimal order are connected directly to corresponding and predetremined orders of a binary register 15.

The remaining 9 binary digits of the T, H, and TH decimal orders of the register 10 enter a translator 20. The translator 20 acts on each permutation of the 9 input lines and presents to the binary register 15 a unique combination of binary bits on 7 output lines.

The binary register 15 represents a memory address register contained in a standard three-dimensional memory unit. Each unique combination of binary digits entered into the register 15 will address a particular memory location through a decoding switching matrix contained in the memory unit.

A representative environment for the present invention can be found in U.S. Patent 2,960,683—Data Coordinator—by R. A. Gregory et al., which discloses a three-dimensional memory and associated addressing means. FIGURE 6 of the above patent shows a binary address counter 112 and 124 and a binary address register 132. The present invention would modify FIGURE 6 of the above patent by replacing the binary address counter 112 and 124 with the binary coded decimal register 10 of FIGURE 1. The binary register 15 of FIGURE 1 corresponds to the binary register 132 in the patent. The present invention, translator 20 of FIGURE 1, would be placed between the binary coded decimal register and the straight binary address register.

The preferred embodiment of this invention has found actual use with a standard memory unit originally designed for a straight binary computing system. The three-dimensional core array which acts as the memory consists of thirty-five core planes capable of storing words at 16,384 addressable locations. The 16,384 locations may be identified and located by 128 X coordinates and 128 Y coordinates. In the binary system therefore, the binary memory address register is required to provide 14 binary lines. Seven binary lines would be required to address one coordinate of a core plane and seven binary lines would be required to address a second coordinate of each core plane. The seven binary lines for each coordinate would be presented to a switch matrix which would provide 128 ($2^7$) inputs to each core plane for a particular coordinate.

The translator of the present invention has been put to practical use with a binary coded decimal computing system which operates on computer words consisting of five characters. Each of the five characters making up the computer word consists of 4 binary coded decimal positions and three zone positions. The thirty-five planes of the standard memory unit will therefore provide, at a single address position, a group of 5 binary coded decimal characters to make up a 35 position binary coded decimal computer word.

The binary coded decimal memory address register 10 is capable of identifying 80,000 binary coded decimal characters. The units position (U) of the binary coded decimal register 10 will identify adjacent groups of 5 binary coded decimal characters. The binary coded decimal address is required only to identify a computer word group of 5 binary coded decimal characters to read that location from memory. Thus, the logic circuits 11, 12, and 13 provide a binary indication to the binary memory address register 15 indicating that the particular binary coded decimal character is in the group of 5 characters from 0–4 or 5–9. If the identified binary coded decimal character is less than 5, a binary "0" would be inserted in the predetermined binary register 15 position 6. If the identified binary coded decimal character were 5 or greater, the next adjacent memory position would be addressed by inserting a logical binary "1" in the binary register 15 position 6. Thus it can be seen that the binary coded decimal memory address register 10, capable of identifying 80,000 binary coded decimal locations is only required to indicate 16,000 binary memory positions.

The theory behind the inventive concept of the present invention can best be seen in connection with FIGS. 2 and 3 and the table below which represents the possible bit combinations of a binary coded decimal order:

| | 8 4 2 1 | | 8 4 2 1 |
|---|---|---|---|
| 0 | 0 0 0 0 | 5 | 0 1 0 1 |
| 1 | 0 0 0 1 | 6 | 0 1 1 0 |
| 2 | 0 0 1 0 | 7 | 0 1 1 1 |
| 3 | 0 0 1 1 | 8 | 1 0 0 0 |
| 4 | 0 1 0 0 | 9 | 1 0 0 1 |

The problem arises of finding the most efficient means for obtaining 16,000 unique binary combinations in binary register 15 from the 80,000 address capibility of the register 10. An examination of the table above shows that the 4 binary digits of each decimal order are only required to count from 0–9 while their binary capability is to count to 15. Thus only 10/16 of the 4 binary digits capabilities are being utilized. In an overall picture, the 19 binary digits of the register 10 would be capable of $2^{19}$ different combinations if applied directly to the binary memory address register 15. Since the binary coded decimal mode of coding has been utilized in register 10, the register is capable of counting to only 80,000 which is approximately 15% of its binary counting capabilities.

Another inefficiency is apparent from the above table.

If it were desired to translate the binary coded decimal number contained in register 10 to the direct equivalent binary representation in register 15, logical circuitry would have to be included for translating all of the binary digits of each decimal order. At one extreme, it can be seen that the highest order binary digit of each decimal order is a binary "0" for 8 out of the possible 10 combinations. The highest order binary digit of each decimal order divides the total combinations possible into two classes. One class having 1/5 the combinations and the other class 4/5 the total combinations.

At the other extreme, apparent in the above table, is the lowest order binary digit of each decimal order. For every other possible combination of the binary digits, the lowest order binary digit is either "0" or "1." It can be seen therefore that the lowest order binary digit of each decimal order is exercised quite extensively and divides the total possible combinations into two equal parts with no redundancy. For this reason very little would be gained by providing complicated translating circuitry just to indicate that half the time the lowest order binary digit will be one stable state and half the time it will be of the opposite stable state.

In the highest order decimal position (TTH), which is required only to count to seven, there are no idle binary digits as all of the binary digits are exercised throughout its maximum count. The binary coded decimal and straight binary capabilities of the highest order decimal digit are the same. There is no inefficiency as was the case with other decimal orders containing 4 binary digits, therefore, these binary digits may be entered directly into the binary register 15.

For the above stated reasons, the lowest order binary digit of the T, H, and TH and all of the binary digits of the TTH decimal orders are sent directly to the binary register 15.

With reference to FIG. 2 it can be seen that if the lowest order binary digit of each decimal order is disregarded, the remaining three binary digits will assume five different combinations. This means that the three remaining binary digits of each of the decimal orders T, H, and TH will provide 125 permutations ($5\times5\times5$). The seven binary digits which were transferred directly to the binary register 15 will produce $2^7$ or 128 different permutations and the remaining binary digits will provide 125 permutations which results in a total of 16,000 desired permutations or unique addresses ($128\times125$). The problem remains of converting the 9 binary digits of the T, H, and TH orders of the binary coded decimal register 10 to 125 unique binary combinations. The 125 binary combinations can be realized on seven output lines. Therefore, the nine input lines to translator 20 of FIG. 1 must be translated to seven binary lines in the most efficient manner.

FIG. 3 shows the manner in which the translator 20 receives nine binary digits from the binary coded decimal register 10 and presents seven binary digits to the binary register 15. The binary output lines from translator 20 are identified by the binary register 15 positions B7–B13.

An examination of the highest order binary digit of each of the binary coded decimal orders dictates the possible permutations the remaining lines can assume. The highest order binary digits of all the decimal orders to be translated can assume 8 possible combinations. These combinations are defined by Case 1, 2, 3 and 4 shown in FIG. 3. Case 1 defines the situation where a binary "1" is not present as a highest order binary digit in any of the decimal orders. Case 2 defines the situation in which one of the binary coded decimal orders contains a binary "1" in its highest order binary digit. Case 3 defines the situation in which two of the possible three binary coded decimal orders contain a binary "1" in its highest order binary digit. Case 4 defines the situation in which a binary "1" appears in the highest order binary digit of all of the decimal orders.

An examination of FIG. 2 showing the possible binary digit combinations in each decimal order when the lowest order digit is disregarded shows that if the highest order binary digit is a binary "0" the remaining two binary digits will have significance. In a like manner, it is readily apparent that if the highest order binary digit is a binary "1" the remaining two binary digits can only be binary "0." This forms the basis for generating the matrix of FIG. 3 for developing the translator 20 of FIG. 1.

In the following discussion in which the different cases are shown, the decimal orders are identified as previously as T, H, and TH, to represent the 10's, 100's, and 1000's decimal orders respectively. The number designation for each decimal order indicates the binary digit position within the designated decimal order. A bar across the top of the decimal order and binary digit designation indicates the absence of a binary "1."

*Case 1.*—When there is no binary "1" in each of the highest order decimal digits of all of the decimal orders, binary line B13 is set to "0." Case 1 represents the situation in which all of the remaining binary digits of each of the decimal orders are significant. Therefore, in Case 1, each decimal order is capable of assuming four different combinations and will therefore produce $4^3$ or $2^6$ different permutations. Binary lines B7–B12 therefore will produce along with B13, 64 unique binary combinations for the Case 1 situation.

*Case 2.*—The Case 2 situation reveals that at least one of the decimal orders contains a binary "1" in its highest order binary digit. In this case binary line B13 is set to "1." Binary lines B11 and B12 are encoded to identify the decimal order that contains a binary "1" in its highest order binary digit. When H8 is present this means that the remaining binary digits in the H order have no significance. However, in this case, the remaining binary digits of the T and TH orders will have significance as they can be present. For this particular case when H8 is present, binary lines B11 and B12 are both set to "0" and the remaining binary lines B7–B10 will assume $4^2$ or $2^4$ unique combinations. The three possible situations of Case 2 will therefore produce 16+16+16 or 48 unique binary combinations on binary lines B7–B13.

*Case 3.*—The Case 3 situation reveals that only one binary coded decimal order can be capable of producing four combinations on the remaining two binary digit lines. In the Case 3 situation binary lines B11–B13 are all set to binary "1." Binary lines B9 and B10 are encoded to indicate the binary coded decimal order that does not contain a binary "1" in its highest order binary digit. If two of the binary coded decimal orders contain a binary "1" in its highest order binary digit the remainng bnary coded decimal order can only assume four possible binary combinations. Therefore each of the situations in Case 3 will produce $4^1$ or $2^2$ unique combinations on lines B7 and B8. The Case 3 situation will therefore produce 4+4+4 or 12 unique binary combinations on lines B7–B13.

*Case 4.*—The Case 4 situation indicates that there is binary "1" in the highest order binary digit of all of the binary coded decimal orders. In this case the remaining two binary digits of all of the orders can have no sgnificance. In the Case 4 situation binary lines B9–B13 are all set to "1" and binary lines B7 and B8 are set to "0." The Case 4 situation thus produces only one binary combination on the lines B7–B13.

It is now apparent that the nine binary coded decimal lines have produced a total of 125 unique binary combinations on the binary lines B7–B13 (64+48+12+1). Since the seven binary lines taken directly to the binary register 15 from the binary coded decimal register 10 can produce 128 unique binary combinations we have achieved the desired 16,000 unique binary combinations (128×125).

From the table in FIG. 3 it is possible to write a Boolean equation for each of the binary lines B7–B13.

As an example, the Boolean equation for the binary line B13 would be:

$$(T8\cdot H8\cdot TH8)+(T8\cdot \overline{H8}\cdot TH8)+(\overline{T8}\cdot H8\cdot TH8)+(T8\cdot H8\cdot \overline{TH8})+(T8\cdot \overline{H8}\cdot \overline{TH8})+(\overline{T8}\cdot \overline{H8}\cdot TH8)+(\overline{T8}\cdot H8\cdot \overline{TH8})=B13$$

The same type of Boolean equation can be written for each of the other binary lines B7–B12. A simplification of each of these Boolean equations will produce the equations shown below:

$$B7=T2+T8\cdot TH2+H2\cdot T8\cdot TH8$$
$$B8=T4+T8\cdot TH4+H4\cdot T8\cdot TH8$$
$$B9=\overline{T8}\cdot H2+\overline{T8}\cdot H8\cdot TH2+H2\cdot \overline{TH8}+H8\cdot TH8$$
$$B10=T8\cdot TH8+H4+\overline{T8}\cdot H8\cdot TH4$$
$$B11=T8\cdot H8+\overline{T8}\cdot \overline{H8}\cdot TH2+TH8$$
$$B12=T8+H8\cdot TH8+\overline{H8}\cdot TH4$$
$$B13=T8+H8+TH8$$

FIG. 4 shows the means by which each permutation of the nine binary coded decimal digits to be translated in translator 20 produces a unique combination of binary digits for presentation to the binary register 15. A series of AND circuits and OR circuits are provided with the necessary inputs to produce the logical outputs on binary lines B7–B13 as defined by the Boolean equations written above.

It will be apparent to those skilled in the art that the 16,000 unique binary combinations inserted in the binary register 15 do not produce a numerical quantity equal to the numerical quantity in the binary coded register 10. It is also apparent, however, that each different binary coded decimal address presented to the memory unit will define the necessary 16,000 unique positions in the memory. It is not important that adjacent memory locations be related by a difference of a single address. The only requirement is that each binary coded decimal address will define a unique position in the memory.

It is felt that this inventive concept provides the simplest and most economical means ever achieved in a binary coded decimal to straight binary memory address translator. It would be possible to extend the theory of this invention to provide 80,000 unique binary combinations for the 80,000 possible binary coded decimal addresses. This could be accomplished by again taking seven lines directly from the binary coded decimal register 10 to the binary register 15. In this particular case, the units decimal order would present its lowest order binary digit directly to the binary register 15. A table similar to that shown in FIG. 3 could be set up whereby the three remaining binary digits of the decimal orders U, T, H, and TH could be translated based upon the presence or absence of a binary "1" in the highest order binary digit of the four binary coded decimal orders. In this case we would have $2^7$ or 128 unique binary combinations presented directly to binary register 15 and would have 5×5×5×5 different permutations of the remaining lines. It would be possible through the logic of the table shown in FIG. 3 and additional logic to that shown in FIG. 4 to produce 625×128 or 80,000 unique binary combinations. This would require that the 12 input lines to the translator 20 produce outputs on 10 binary lines to the binary register 15.

It would also be possible to obtain 80,000 unique binary combinations from the embodiment shown by again using translator 20 for producing 7 binary lines from 9 binary coded decimal digits to give 125 combinations in register 15. In this case 10 lines would be taken directly from binary coded decimal register 10 to binary register 15. These 10 lines could include all digits from the TTH order, the lowest order binary digit from the three decimal orders to be translated, and all the binary digits of one of the decimal orders.

This translation would not be quite as efficient as that previously discussed. There would be produced a binary address on 17 binary lines to be presented to the switching matrix. The 17 binary lines are capable of producing 131,072 unique combinations. Since only 80,000 are needed this cuts down the maximum capabilities of the 17 binary lines.

The same translator 20 could also be used efficiently for converting a maximum binary coded decimal number of 1,000, requiring three decimal orders, to 1,000 unique binary combinations. In this case the lowest order binary digit of all three decimal orders would be transferred directly to a binary register 15 and the remaining 9 lines would be translated to 7 binary lines giving the necessary 10 binary lines to register 15.

While the invention has been particularly shown and described with reference to a preferred embodiment thereof, it will be understood by those skilled in the art that the foregoing and other changes in form and details may be made therein without departing from the spirit and scope of the invention.

We claim:

1. A system for translating a multi-order binary coded decimal number contained in a first register to a straight binary combination in a plurality of orders of a second register comprising, means directly connecting at least one binary digit from each decimal order to be translated of said first register to a corresponding predetermined order of said second register, and means responsive to each permutation of the remaining binary digits of said binary coded decimal orders to be translated for inserting a unique combination of binary digits in the remaining orders of said second register.

2. A system for translating a multi-order binary coded decimal number contained in a first register to a straight binary combination in a plurality of orders of a second register comprising, means directly connecting at least the lowest order binary digit from each decimal order to be translated of said first register to a corresponding predetermined order of said second register, and means responsive to each permutation of the remaining binary digits of said binary coded decimal orders to be translated for inserting a unique combination of binary digits in the remaining orders of said second register.

3. A system for translating a multi-order binary coded decimal number contained in a first register to a straight binary combination in a plurality of orders of a second register comprising, means directly connecting at least the lowest order binary digit from each decimal order to be translated of said first register to a corresponding predetermined order of said second register, and logic means responsive to the presence or absence of binary ones in the highest order binary digit of each of the decimal orders to be translated for inserting a unique combination of binary digits in the remaining orders of said second register.

4. A translating system in accordance with claim 3 wherein said logic means includes means responsive to the absence of binary ones in the highest order binary digit of all of the binary coded decimal orders to be translated for inserting a predetermined binary digit in a predetermined order of said second register, and means responsive to each permutation of the remaining binary digits of said binary coded decimal orders to be translated for inserting a unique combination of binary digits in the remaining orders of said second register.

5. A translating system in accordance wtih claim 3 wherein said logic means includes means responsive to the presence of a binary one in the highest order binary digit of only one of the binary coded decimal orders to be translated for inserting a predetermined binary digit in one of the orders of said second register and for inserting a plurality of binary digits in a corresponding plurality of orders of said second register identifying the particular binary coded decimal order which contains a binary one in the highest order binary digit, and means responsive to each permutation of the remaining binary digits of said binary coded decimal orders to be translated which do not contain a binary one in the highest order binary digit for inserting a unique combination of binary digits in the remaining orders of said second register.

6. A translating system in accordance with claim 3 wherein said logic means includes means responsive to the absence of a binary one in the highest order binary digit of only one of the binary coded decimal orders to be translated for inserting a predetermined binary digit in a plurality of predetermined orders of said second register and for inserting in a plurality of orders of said second register a combination of binary digits identifying the binary coded decimal order which does not contain a binary one in the highest order binary digit, and means responsive to each permutation of the remaining binary digits of said binary coded decimal order to be translated which does not contain a binary one in the highest order binary digit for inserting a unique combination of binary digits in the remaining orders of said second register.

7. A translating system in accordance with claim 3 wherein said logic means includes means responsive to the presence of a binary one in the highest order binary digit of all the binary coded decimal orders to be translated for inserting a unique combination of binary digits in the remaining orders of said second register.

References Cited in the file of this patent

UNITED STATES PATENTS

| | | |
|---|---|---|
| 2,860,831 | Hobbs | Nov. 18, 1958 |
| 2,864,557 | Hobbs | Dec. 16, 1958 |
| 2,866,184 | Gray | Dec. 23, 1958 |
| 3,008,638 | Handles | Nov. 14, 1961 |

FOREIGN PATENTS

IBM Technical Disclosure Bulletin, (1) Vol. 2, No. 6, April 1960, p. 46, (2) Vol. 3, No. 1, June 1960, p. 56.